J. R. McELHANEY.
METHOD AND APPARATUS FOR MAKING TERNE PLATES.
APPLICATION FILED DEC. 24, 1920.

1,392,588.

Patented Oct. 4, 1921.
3 SHEETS—SHEET 1.

Witnesses:
Edwin Trueb

Inventor:
James R. McElhaney
by D Anthony Usina
Atty.

J. R. McELHANEY.
METHOD AND APPARATUS FOR MAKING TERNE PLATES.
APPLICATION FILED DEC. 24, 1920.
1,392,588.
Patented Oct. 4, 1921.
3 SHEETS—SHEET 2.
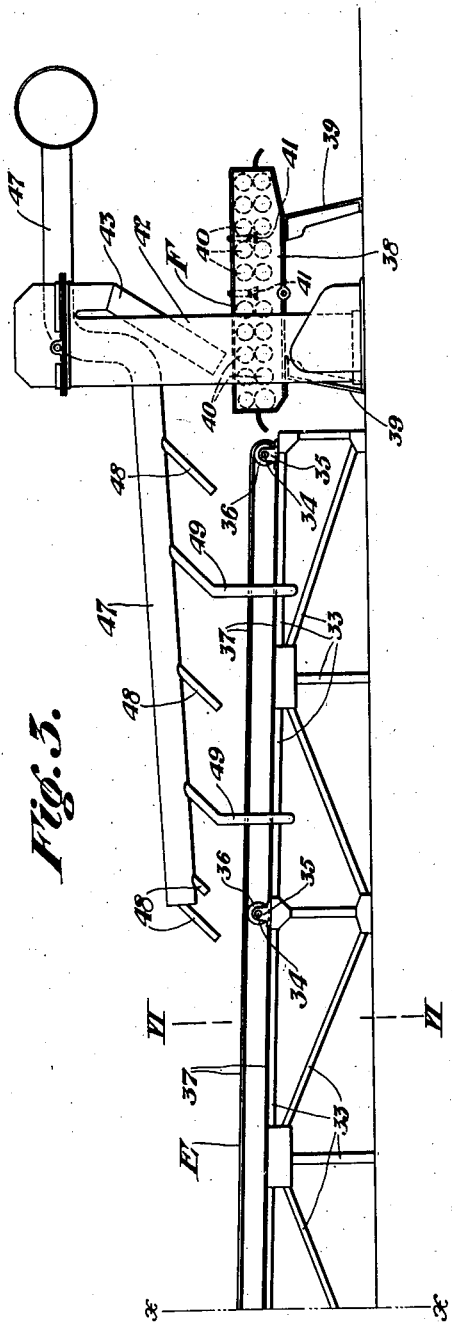
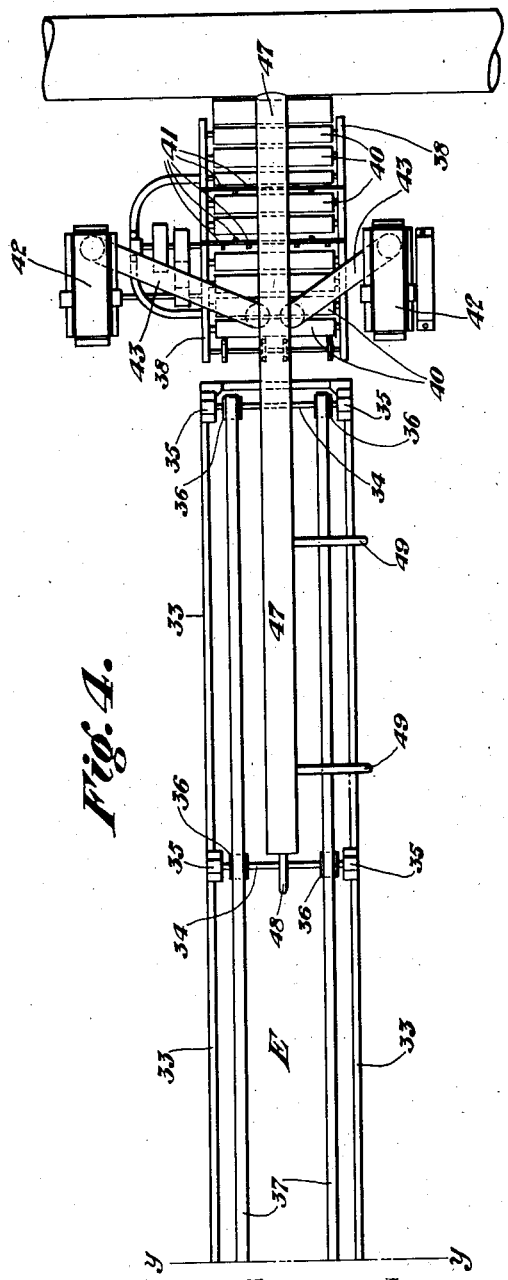

J. R. McELHANEY.
METHOD AND APPARATUS FOR MAKING TERNE PLATES.
APPLICATION FILED DEC. 24, 1920.

1,392,588.

Patented Oct. 4, 1921.
3 SHEETS—SHEET 3.

UNITED STATES PATENT OFFICE.

JAMES R. McELHANEY, OF VANDERGRIFT, PENNSYLVANIA, ASSIGNOR TO AMERICAN SHEET AND TIN PLATE COMPANY, OF PITTSBURGH, PENNSYLVANIA, A CORPORATION OF NEW JERSEY.

METHOD AND APPARATUS FOR MAKING TERNE PLATES.

1,392,588.             Specification of Letters Patent.        Patented Oct. 4, 1921.

Application filed December 24, 1920. Serial No. 433,041.

*To all whom it may concern:*

Be it known that I, JAMES R. McELHANEY, a citizen of the United States, and resident of Vandergrift, in the county of Westmoreland and State of Pennsylvania, have invented certain new and useful Improvements in Methods of and Apparatus for Making Terne Plates, of which the following is a specification.

This invention relates to the manufacture of terne plates, and more particularly to the production of long terne plates. One object of the invention is the provision of novel means whereby much of the manual labor heretofore necessary in producing such plates is eliminated and made unnecessary.

Another object of the invention is to provide means whereby the output of plates is materially increased with less labor and consequently less expense.

A further object of the invention is to provide a long terne plate of better quality than heretofore possible with existing method and apparatus.

These and other objects and advantages to be hereinafter more fully brought out, are obtained by the combination and arrangement of parts illustrated in the accompanying drawings, and described and claimed in the following specification.

In the accompanying drawings, forming part of this specification, Figure 1 is a longitudinal side elevation of a part of the apparatus embodying certain features of my invention, and adapted for use in producing long terne plate in accordance with the method forming part of the invention.

Fig. 3 is a side elevation of the apparatus continued from the line X—X of Fig. 1.

Fig. 4 is a top plan of the apparatus of Fig. 3 and forms a continuation from the line Y—Y of Fig. 2.

Figure 1:
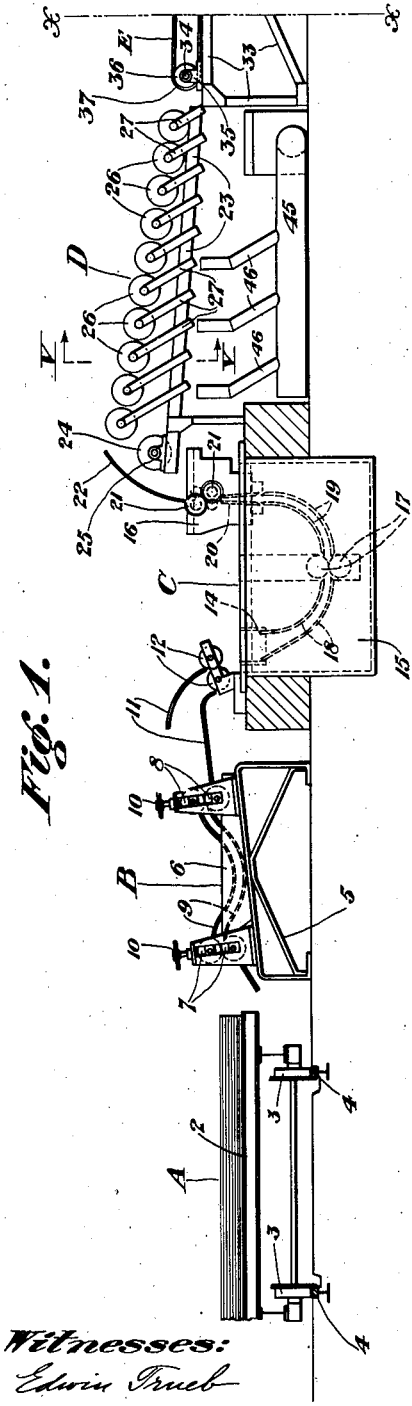
Figure 2:
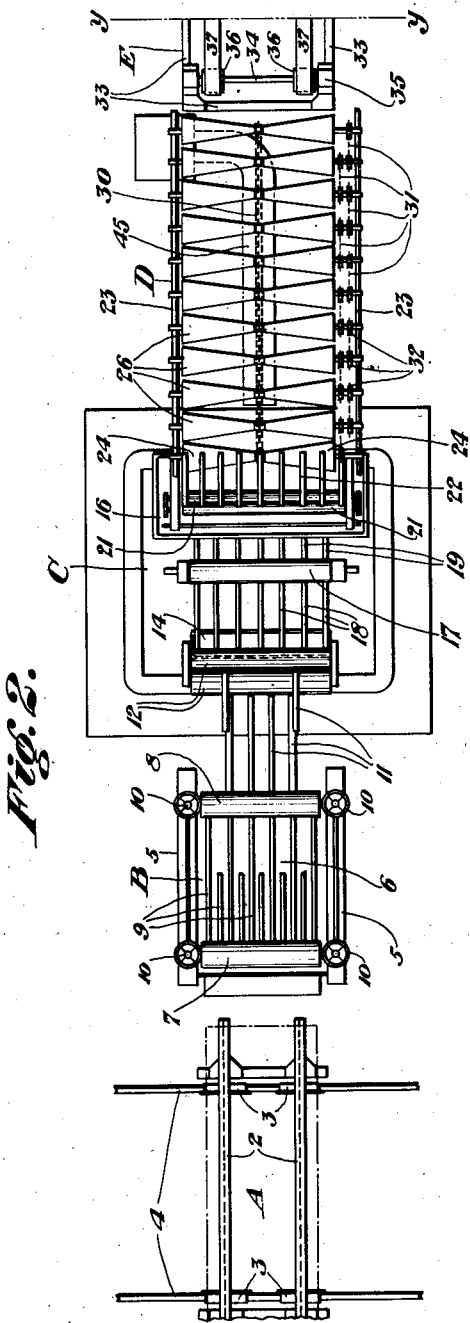
Fig. 2 is a top plan of the same apparatus.
Figure 5:
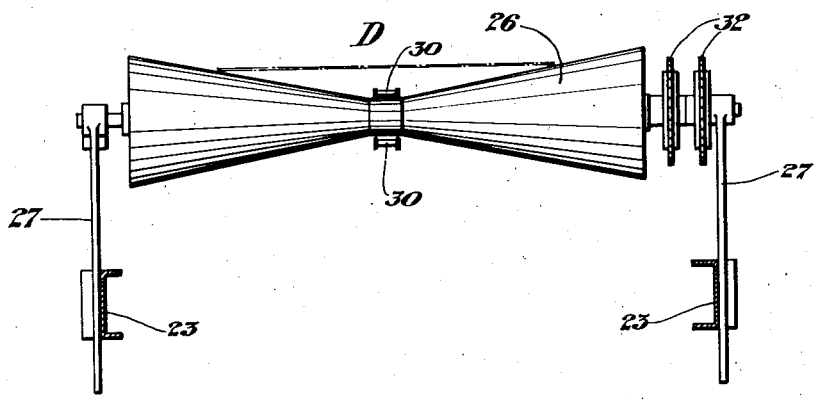
Fig. 5 is a sectional end elevation of the cone conveyer taken on the line V—V of Fig. 1.
Figure 6:
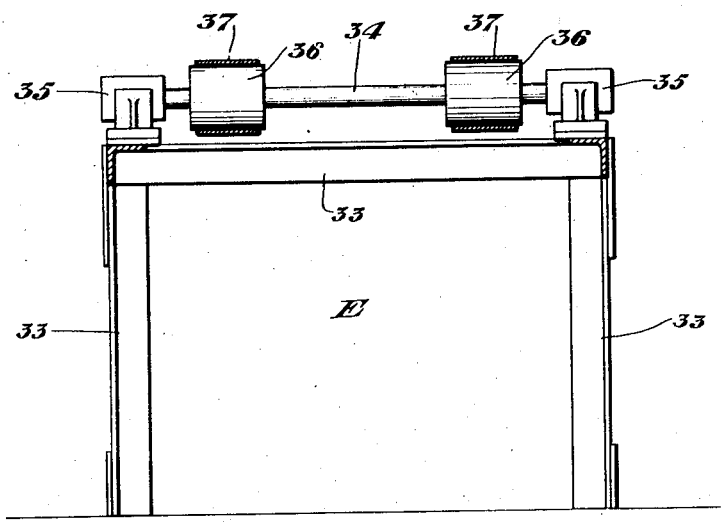
Fig. 6 is a sectional end elevation of the belt conveyer taken on the line VI—VI of Fig. 3.

Referring now to the drawings, the letter A designates generally a truck for holding a pile of oiled plates in readiness to be fed into the apparatus, and B an acid cleaning apparatus. The letter C designates the terne pot as a whole, and D the cone conveyer forming part of my improved apparatus. E designates a flat belt conveyer, and F the cleaning and polishing machine.

The truck A may be of ordinary design, or a table or bench may be substituted for the truck if desired. The truck, as shown, comprises a flat top portion 2 supported on a suitable underframe and having flanged wheels 3 adapted to travel on the track 4.

The truck A is arranged to support a pile of the plates in position to be fed successively into the acid cleaning apparatus B. This cleaning apparatus comprises an underframe 5, and tank 6, the tank having a pair of feed rollers 7 at its forward end and a pair of feed-out rollers 8 at its rear end, suitable plate guides 9 being located between the set of rollers, to guide the plates downwardly into the acid solution in the tank 6. The upper roller of each pair of rollers 7 and 8 is provided with an adjustable bearing adapted to be moved by hand operated screws 10.

Suitable guides 11 are arranged to receive the plates as they emerge from between the feed rollers 8 and guide them between a pair of feed rollers 12 on the forward end of the terne pot. This terne pot comprises a flux box 14, terne pot 15, and oil box 16, and suitable feed and guide rollers 17 are mounted on the bottom of the terne pot with suitable guides 18 arranged between the flux box 14 and the rollers 17 to guide the plates downwardly and between said rollers. The plates, as passed between the rollers 17, are received by a second set of guides 19 arranged between the rollers 17 and the oil box 16, and adapted to guide the plates upwardly and into the oil box.

The oil box 16 is provided with a set of short guides 20 adapted to receive the plates as they enter the box and guide them between suitable feed-out rollers 21, which are kept immersed in the oil in said box and thereby receive an oil coating.

A set of guides 22 is arranged above the oil box 16, these guides being curved toward the conical conveyer D, so as to direct the sheets to said conveyer.

The conveyer D comprises an underframe 23 having an initial receiving roller 24 on the forward end of the frame, overlying the oil box 16. The roller 24 is mounted on short vertical bearings 25 so as to be in close proximity to the frame. A plurality of conveyer rollers 26 are mounted on extended bearing posts 27, which are adjustably mounted on the underframe and are inclined forwardly. Each pair of posts 27 is shorter than the preceding pair, so that each roller is closer to the underframe, thereby forming a downwardly and rearwardly directed roller conveyer. The underframe 23 is also lower at its rear end than at its forward end, thereby increasing the inclination of the roller conveyer.

The rollers 24 and 26 are of novel construction, each gradually decreasing in diameter from each end toward its center, forming a double cone shaped member. As the plates are received on the conveyer D, only their side edges will rest on the rollers, due to their novel construction, thus preventing scratching or otherwise marking or defacing the surfaces of the plates.

An endless sprocket chain or belt member 30 is trained about the centers of the rollers 24 and 26 to prevent small or short plates falling between the rollers during the operation of the device.

The rollers 24 and 26 are connected so as to move together at equal surface speed by means of the series of short chains 31, extending around the sprockets 32.

The belt conveyer E comprises an underframe 33 having shafts 34 journaled in bearings 35 on its upper surface, and each shaft is provided with a pair of pulleys 36. A pair of continuous belt conveyers 37, which are trained about the pulleys 36, are arranged to carry the plates to the cleaning and polishing machine F.

This cleaning and polishing machine F, is of usual and well known design, and comprises a casing 38 having legs 39, and having a plurality of rollers 40 and brushes 41, within the casing for acting on the plates. Bran or the like is fed to the cleaner from an elevator 42 through a feed pipe 43, and coacts with the brushes and rollers in the cleaning operations.

As the plates emerge from the terne pot C, they are hot and the terne coating is still in semi-plastic state, so that by applying a blast of air against the under surfaces of the coated plates as they travel on the conical roller conveyer D, the plates are quickly cooled. An air main 45 positioned under the conveyer is provided with a plurality of upwardly opening branches 46.

The plates are still further cooled as they pass along the belt conveyer E by blasts of air from an air main 47 arranged above the conveyer and provided with a plurality of branch outlets 48 and 49, the tubes 48 being directed against the upper surface of the plates, while the branches 49 curve around and under the conveyer, and are directed against the lower surface plates on the conveyer.

The plates in passing along the conveyer E, are thoroughly cooled.

In practising my improved method, with the apparatus which has been described, the plates are removed from the trunk A, and inserted between the feed-in rollers 7, leading into the acid cleaning bath. The plates pass between the guides 9 in the tank, thus being immersed in the acid sufficiently to clean their surfaces. The plates then pass through the feed-out rollers 8 and between the guides 11. The plates pass through the guides 11 and are fed between the rollers 12 of the terne pot, which feeds them through the flux in the flux box 14, and then between the guides 18, which are immersed in the molten coating metal. The feed rollers 17 then grip the plates and feed them upwardly between the guides 19. The plates in passing down between the guides 18 and up between the guides 19, receive a coating of the molten metal in the terne pot. The coated plates emerge from between the guides 19, and enter between the guides 20 in the oil box 16, and then pass through the oil, thereby receiving the oil coating. The coated plates then pass between other feed rollers 21, which feed the plates out of the terne pot and onto the conical conveyer D. The double cone shape of the rollers of the conveyer D is such that only the edges of the plates bear on the rollers and scratching or marring of the surfaces of the plates is thereby avoided.

The plates in passing along the conveyer D, are cooled by the air blast from the branch pipes 46 on the air main 45.

The somewhat cooled plates then pass from the conveyer D, upon the belt conveyer E, and are conveyed to the cleaning and polishing machine F, where the oil is removed from their surfaces and the plates are polished.

The plates while being conveyed by the belt conveyer E, are further cooled by air from the branch pipes 48 and 49, leading from the air main 47.

It will be understood that while I have illustrated and described one particular apparatus embodying my invention, it is only illustrative, and, therefore, I do not wish to be limited to the apparatus shown, since various changes in details in the construction and arrangement of the parts may be made without departing from my invention, as defined in the appended claims.

I claim:—

1. The combination with a terne pot, rollers, for feeding plates into and out of said pot, and guides for the plates, of a conveyer for receiving plates emerging from said pot, said conveyer being constructed to engage only the longitudinal edges of said plates, and thereby preventing marring the surfaces of the coated plates.

2. The combination with a terne pot, rollers, for feeding plates into and out of said pot, and guides for the plates, of a conveyer for receiving the plates emerging from said pot, said conveyer comprising a plurality of rollers of gradually reducing diameter toward the center thereof, forming a double cone shaped member adapted to engage the longitudinal edges of said plates.

3. The combination with a terne pot, rollers, for feeding plates into and out of said pot, and guides for the plates, of a conveyer for receiving the plates emerging from said pot, said conveyer comprising a plurality of rollers of gradually reducing diameter toward the center thereof, forming a double cone shaped member, adapted to engage the longitudinal edges of said plates, and an endless flexible member extending around the center of said conveyer rollers, and thereby preventing short plates falling therebetween.

4. The combination with a terne pot, feed rollers for conveying plates into and out of said pot, and guides for the plates, of a conveyer for receiving the plates emerging from said pot, said conveyer comprising a plurality of rollers having a gradually reducing diameter toward the center thereof, forming a double cone shaped member adapted to engage only the longitudinal edges of said plates, and means below said conveyer for delivering air currents against said plates during the passage thereof, over said conveyer, to thereby cool the plates.

5. The combination with a terne pot for the coating of long terne plates, feed rollers for conveying plates into and out of said pot, and guides for the plates, of an acid cleaning tank adapted to receive the plates, said tank having means for feeding the plates therethrough and into engagement with the feed rollers of said terne pot, and a conveyer for receiving the plates emerging from said pot, said conveyer being so constructed and arranged to engage only the longitudinal edges of said plates, and thereby prevent marring of the surfaces thereof.

6. The combination with a terne pot for the coating of long terne plates, rollers for feeding plates into and out of said pot, and guides for the plates, of an acid cleaning tank adapted to receive the plates, said tank having means for feeding the plates therethrough and into engagement with the feed rollers of said terne pot, and a conveying mechanism for receiving the plates emerging from said terne pot, said conveyer delivering said plates to a cleaning and polishing machine, and comprising a plurality of rollers having a gradually reducing diameter toward the center thereof, forming a double cone shape, a continuous belt conveyer adapted to receive the plates from said roller conveyer, and means adjacent each conveyer for directing air currents against said plates in the travel thereof, along said conveyers.

7. The combination with a terne pot of a mechanical conveyer for carrying the plates from said pot, said conveyer comprising a base, a plurality of adjustable bearing posts mounted in pairs along said base, rollers in each of said pairs of bearing posts, said rollers having a gradually reducing diameter from each end toward their center, thereby forming double cone like members, and means for driving said rollers.

8. The combination with a terne pot of a mechanical conveyer for conveying the plates from said pot, said conveyer comprising a base, a plurality of adjustable bearing posts mounted in pairs along said base, rollers in each of said pairs of bearing posts, said rollers having a gradually reducing diameter from each end toward their center, thereby forming double cone like members, means for driving said rollers, and means for directing air blasts against the plates as they travel along said conveyer.

9. The method of producing long terne plates, which consists in feeding the plates through an acid cleaning bath, then passing the cleaned plates through a suitable flux, the molten metal in a terne pot bath, and an oil bath, in the order named, conveying the oiled plates to a suitable cleaning and polishing machine, directing an air blast against both sides of said plates to cool the same while said plates are being conveyed to said cleaning and polishing machine, and lastly cleaning and polishing the surfaces of the oil covered plates.

10. The method of producing long terne plates which consist in feeding the plates through an acid cleaning bath, then passing the cleaned plates through a suitable flux, the molten metal of a terne pot, and a bath of palm oil, in the order named, then conveying said plates, from the oil bath to a polishing and cleaning machine, by means of a dual conveyer system, the first of said conveyers being adapted to engage only the longitudinal edges of said plates.

11. The method of producing terne plates, which consists in feeding the plates through the molten metal bath, and mechanically conveying the coated plates away from said metal bath, and supporting the plates by engagement with the longitudinal edges thereof, in conveying the plates away from said coating metal bath.

In testimony whereof, I have hereunto set my hand.

JAMES R. McELHANEY.